United States Patent
Karppanen

(10) Patent No.: US 11,017,032 B1
(45) Date of Patent: May 25, 2021

(54) DOCUMENT RECOVERY UTILIZING SERIALIZED DATA

(71) Applicant: Amazon Technologies, Inc., Seattle, WA (US)

(72) Inventor: Jari Juhani Karppanen, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 312 days.

(21) Appl. No.: 15/281,926

(22) Filed: Sep. 30, 2016

(51) Int. Cl.
*G06F 7/00* (2006.01)
*G06F 16/93* (2019.01)
*G06F 11/14* (2006.01)

(52) U.S. Cl.
CPC .......... *G06F 16/93* (2019.01); *G06F 11/1402* (2013.01)

(58) Field of Classification Search
CPC ......... G06F 17/30905; G06F 17/30899; G06F 17/30873; G06F 16/93; G06F 16/951; G06F 16/957; G06F 11/1402
USPC ........................................ 715/230, 234, 273
See application file for complete search history.

(56) References Cited

U.S. PATENT DOCUMENTS

| | | | | |
|---|---|---|---|---|
| 8,214,687 | B2 * | 7/2012 | Colaiacomo | G06F 11/1438 714/10 |
| 8,972,860 | B2 * | 3/2015 | Corbett | G06F 16/44 715/717 |
| 2003/0095135 | A1 * | 5/2003 | Kaasila | G06F 3/0481 345/613 |
| 2004/0133848 | A1 * | 7/2004 | Hunt | G06F 16/9577 715/273 |
| 2007/0226614 | A1 * | 9/2007 | Lorenzen | G06F 17/30905 715/234 |
| 2011/0307880 | A1 * | 12/2011 | Hilerio | G06F 8/61 717/171 |
| 2012/0297429 | A1 * | 11/2012 | Reed | G06F 17/30846 725/86 |
| 2016/0124934 | A1 * | 5/2016 | Greenberg | G06F 3/0482 715/202 |
| 2016/0162597 | A1 * | 6/2016 | Karppanen | G06F 17/30905 715/240 |

* cited by examiner

*Primary Examiner* — Md I Uddin
(74) *Attorney, Agent, or Firm* — Knobbe Martens Olson & Bear LLP

(57) ABSTRACT

Systems and methods for the presentation content on client computing devices. A processing component serializes browser data as a set of serialized data portions that can be incorporated into a serialization file. The serialized data portions can be prioritized to determine an order of priority and the serialized data portions can further be processed in parallel. As the serialized data portions are processed, they can be added to the serialized data file with a completion marker. If the serialization process is interrupted before all the browser information is serialization, the browser is still able to utilize any portions in the serialized data file that are accompanied by a completion marker.

19 Claims, 12 Drawing Sheets

DOCUMENT RECOVERY UTILIZING SERIALIZED DATA

BACKGROUND

Generally described, organizations operate computer networks that interconnect numerous computing systems in support of the organizations' operations. Data centers may house significant numbers of interconnected computing systems, such as private data centers operated by a single organization and public data centers operated by third parties to provide computing resources to customers. Public and private data centers may provide network access, power, hardware resources (e.g., computing and storage), and secure installation facilities for hardware owned by an organization or its customers.

To facilitate increased utilization of data center resources, virtualization technologies allow a single physical computing machine to host one or more instances of virtual machines that appear and operate as independent computing machines to a connected computer user. With virtualization, a single physical computing device can create, maintain, or delete virtual machines in a dynamic manner. In turn, users can request computing resources from a data center and be provided with varying numbers of virtual machine resources on an "as needed" or "as requested" basis. In addition to virtual machines, a data center may provide other computing resources, including hardware computing capacity, data storage space, network bandwidth, and the like.

In some embodiments, a client computing device can utilize a software browsing application to access content provider a content provider. The provider of the software application and content providers are interested in improving the experience of users by improving the time in which content is rendered on the screen.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIG. 4B-1 is a block diagram of the logical network of FIG. 1 illustrating the requesting and processing content utilizing serialized data in accordance with the present application;

FIG. 4B-2 is a block diagram illustrating an exemplary generation of a serialized data file including portions of serialized data;

DETAILED DESCRIPTION

Figure 1:
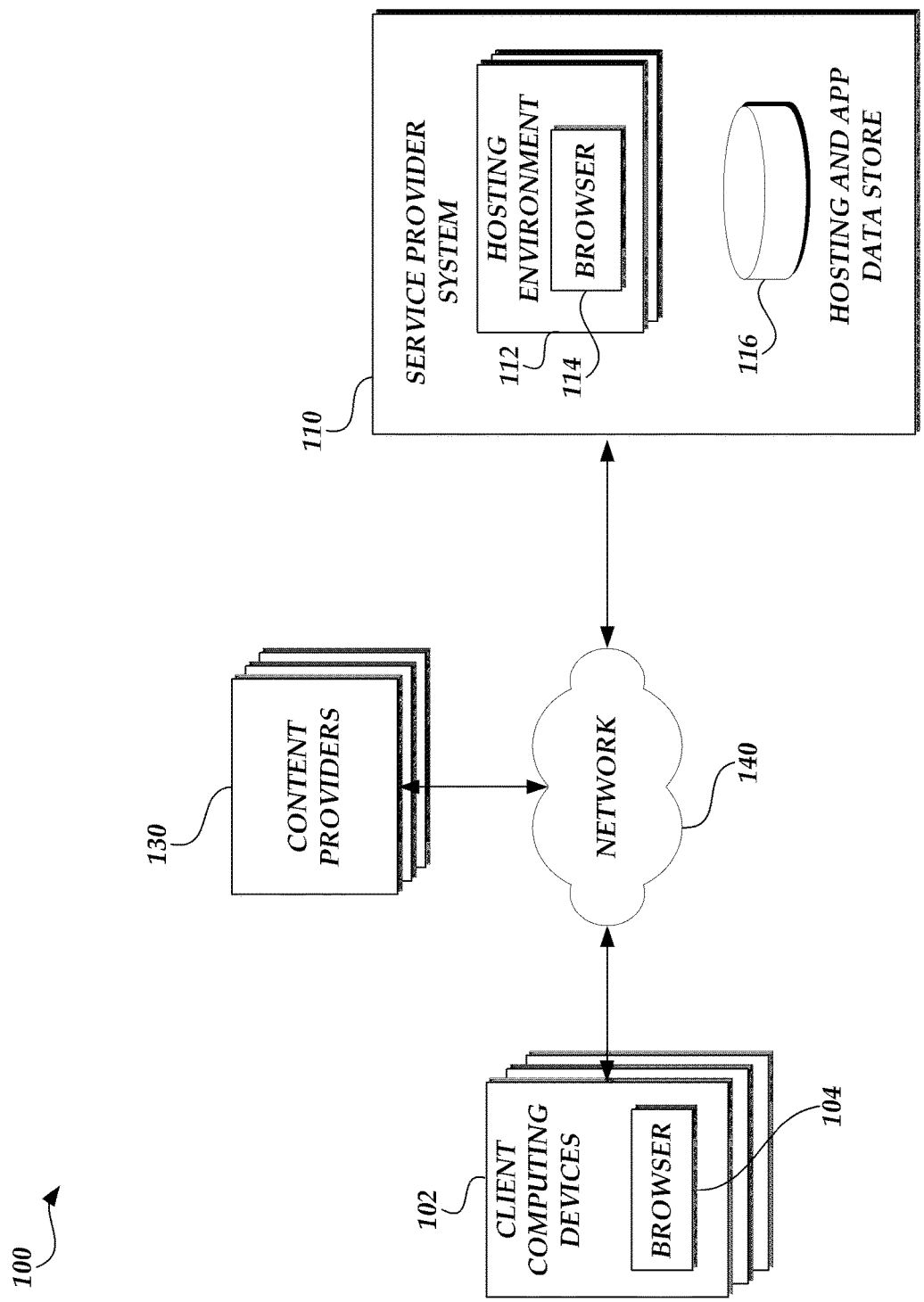
FIG. 1 is a block diagram depicting an illustrative logical network including multiple client computing devices, content providers and a service provider network.

Generally described, the present application corresponds to management of content to be displayed on client computing devices. More specifically, aspects of the present application relate to the processing of content to be rendered on client computing devices utilizing serialized state information from a previous processing of browser content. Illustratively, a client computing device can utilize a browser component or browsing application functionality to access content provided by content providers via a communication network. Once the requested content is obtained from the content provider, the browser component processes the content to generate a processing result that in turn allows the content to be rendered on the client computing device. The processing result can include state information related to document object model ("DOM") tree node information, information related to scripting engine state, information related to network address identifiers, e.g., links, referenced in the content and the like. More specifically, such state information can include, but is not limited to, the attributes of the display objects that are rendered on the display, the results of the processing of scripts or other executable code, initial, intermediate and final values for various variables included in the browser content, and the like. If situations when the requested browser content needs to be requested again, such as in the event of a browser crash, the browser component can serialize the processing result and utilize the serialized data to improve the load characteristics of the subsequent page load.

Illustratively, serialization may include the process of translating data structures or object information into a format that can be stored, for instance as a file in a memory as bits or bytes or otherwise transmitted via a communication medium. Serialization may further include the process of storing the state of the data structure or object. During the serialization process, various information about the data structure and objects, such as the public and private fields of the object and the name of the class, are converted to a stream of bits or bytes for storage. The translated data structure and object information can be reconstructed to create a semantically identical copy of the original data structure or object by reading the series of bits, which can be generally disclosed as de-serialization. Traditional serialization approaches with regard to browser content require that the entire set of data to be serialized to be completed. However, the serialization process can be resource intensive (e.g., generating CPU spikes), which can interfere with the loading of additional browser content. Additionally, if serialization process is delayed or data throughput is throttled, the serialization process is subject to be being interrupted while the serialized data file is being generated. In such situation, if the browser component has not completed the serialization process, the serialization information becomes unusable.

In accordance with aspects of the present application, a browser component can include a processing component or processing functionality that serializes browser data (e.g., the processing results) as a set of serialized data portions that can be incorporated into a serialization file. The serialized data portions can corresponds to various aspects of the processing result, including portions of the DOM tree, render trees, scripting engine states, reference links, machine code, and the like. The browser component can further determine an order of priority for the set of serialized data portions such as based on resources consumed during the processing, the type of state information, content provider preferences, client computing device preferences, and the like. Utilizing the prioritization information, the browser component can then begin serializing the set of state information based on the priority. Additionally, the browser component can further process multiple portions in parallel. Still further, the browser component can include meta-data and other information related to the intermediate processing or the identification of the source browser data that can be utilized in the utilization of the serialized data file.

At the start of the serialization process, the browser component can generate a serialized data file prior to the generation of the serialized data portions. The generated serialized data file can include placeholders for the serialized data portions once they are completed. As individual serialized data portions are processed, they can be added to the serialized data file with a completion marker. The completion marker can be a unique identifier. If the serialization process is interrupted before all the browser information is serialized, the browser is still able to utilize any portions in the serialized data file that are accompanied by a completion marker.

Once the serialized state information is generated (with a full set of serialization information or a partial set of serialization information), the browser component can utilize the serialized portions of the state information in subsequent requests for the browser content, such as in the event of a crash that requires a re-loading of the content. The browser component can transmit a request for the browser content to the content provider (directly or indirectly). In some examples, if the serialized data portions include information that the browser component can utilize to generate visual portions of the requested browser, such as DOM nodes or render tree nodes, the browser component can generate the display elements prior to receiving the requested content. Once the requested browser content is received and matched utilizing the meta-data or other identification information included in the serialized data file, the browser component will attempt to utilize as much of the serialized data file portions that can be matched to the requested content and that are associated with a valid completion marker. Illustratively, each portion of the set of serialized data can be associated with a hash that can be used to match with the corresponding browser content or processing result. If the browser component can match a hash or other identifier, the browser component will attempt to utilize the portion of the serialized data file and may omit processing the received browser content, such as by skipping the parsing of source code. Any portions of the serialized data file that cannot be matched (because they relate to subsequent data requests) or were not associated with a completion marker can be discarded or otherwise ignored. By utilizing at least portions of the serialized data file, the speed and subsequent processing of the browser content can be increased and the utilization of computing device resources can be decreased. Such benefits may be more evident in embodiments in which a browser component may have to restore a number of pages of web content (e.g., restoring a multi-tab browsing session).

Although aspects of some embodiments described in the disclosure will focus, for the purpose of illustration, on the illustrative interactions for requesting browser content and processing of specific content types in the creation of at least a partial set of serialized data, one skilled in the relevant art will appreciate that the examples are illustrative only and are not intended to be limiting. Still further, although the present application will be described with regard to illustrative serialized data files, one skilled in the relevant art will appreciate that the exemplary serialized data files and contents of partial serialized data are illustrative in nature and should not be construed as limiting.

FIG. 1 is a block diagram depicting an illustrative logical network 100 including multiple client computing devices 102, multiple content providers 130 and a service provider system 110 in communication via a network 140. While the client computing devices 102 are shown as a group within FIG. 1, the client computing devices 102 may be geographically distant, and independently owned or operated. For example, the client computing devices 102 could represent a multitude of users in various global, continental, or regional locations accessing the service provider system 110. Accordingly, the groupings of client computing devices 102 within FIG. 1 is intended to represent a logical, rather than physical, grouping. Similarly, while one set of illustrative components is shown to represent the service provider system 110, multiple instances of each component may be present within the service provider system 110, and such components may be located within geographically diverse areas (e.g., globally, continentally, or regionally), in order to provide a wide geographical presence for the service provider system 110.

Network 140 may be any wired network, wireless network, or combination thereof. In addition, the network 140 may be a personal area network, local area network, wide area network, cable network, satellite network, cellular telephone network, or combination thereof. In the example environment of FIG. 1, network 140 is a global area network (GAN), such as the Internet. Protocols and components for communicating via the other aforementioned types of communication networks are well known to those skilled in the art of computer communications and thus, need not be described in more detail herein. While each of the client computing devices 102 and the service provider system 110 is depicted as having a single connection to the network 140, individual components of the client computing devices 102, content providers 130 and service provider system 110 may be connected to the network 140 at disparate points.

Client computing devices 102 may include any number of different computing devices capable of communicating with the service provider system 110. For example, individual accessing computing devices may correspond to a laptop or tablet computer, personal computer, wearable computer, server, personal digital assistant (PDA), hybrid PDA/mobile phone, mobile phone, electronic book reader, set-top box, camera, digital media player, and the like. Each client computing device 102 may include one or more data stores (not shown in FIG. 1) including various applications or computer-executable instructions, such as web browsers 104, used to implement the embodiments disclosed herein.

In accordance with embodiments, the service provider system 110 includes a set of hosting environments, illustrated in FIG. 1 as hosting environment 112. As described in further detail below, the hosting environment 112 can host a browser component 114 for interaction with a corresponding browser component 104 instantiated on the client computing device 102. In some embodiments, the service provider system 110 can also include a hosting and app data store 116 for maintaining serialized data files for use in processing browser content requests. It will be appreciated by those skilled in the art that the service provider system 110 may have fewer or greater components than are illustrated in FIG. 1. Thus, the depiction of the service provider system 110 in FIG. 1 should be taken as illustrative. For example, in some embodiments, components of the service provider system 110, such as the hosting environment 112 and browser component 114 may be executed by one more virtual machines implemented in a hosted computing environment. Additionally, hosting and app data store 116 may correspond to multiple physical or virtual computing resources that may logically represented as a single component, but may be implement in a distributed manner.

Figure 2:
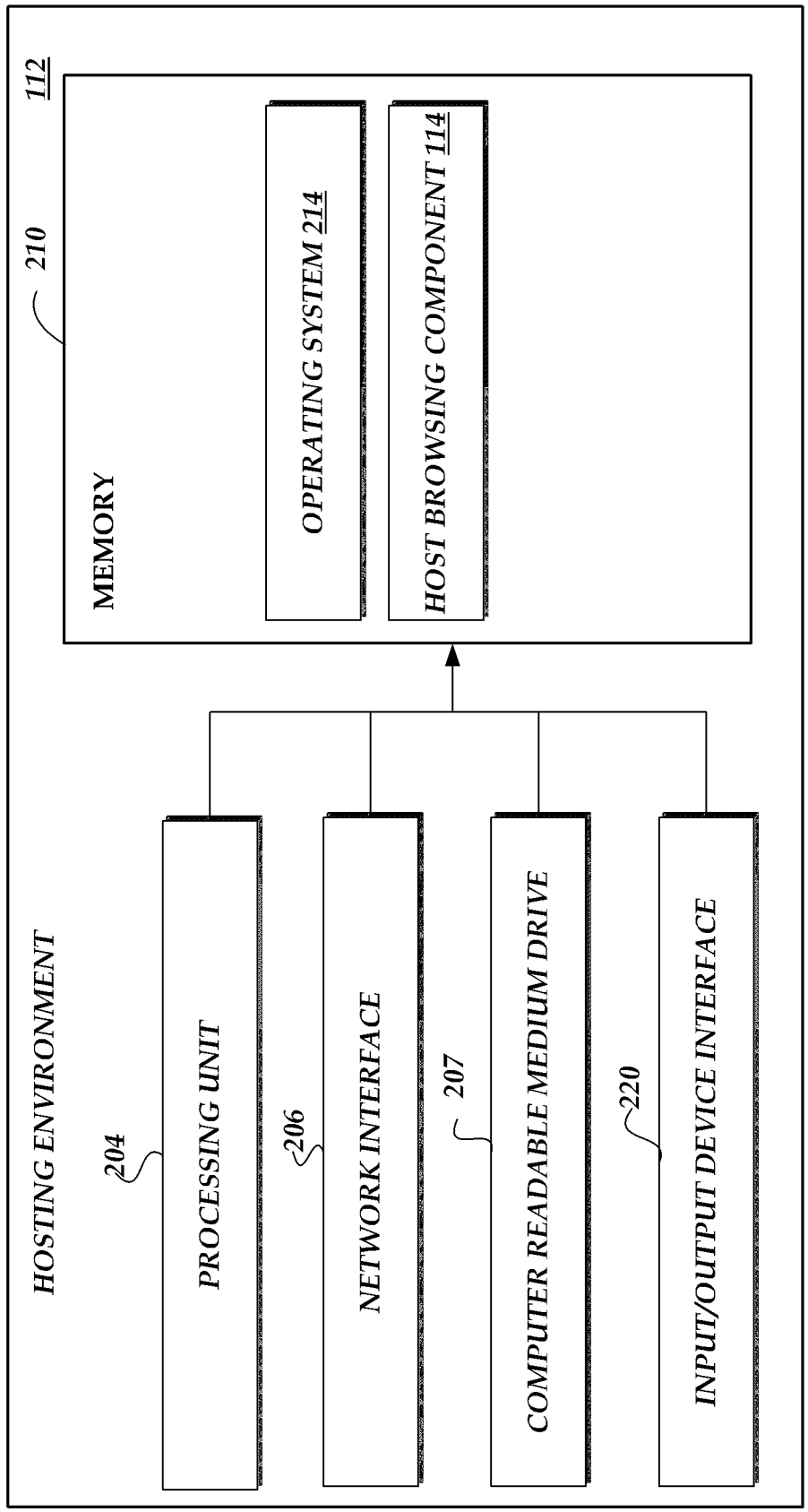
FIG. 2 is a block diagram of illustrative components of a hosting environment for hosting applications in accordance with the present application.

FIG. 2 depicts one embodiment of an architecture of an illustrative of hosting environment, such as hosting environment 112 that host virtualized applications, such as browser component 114 in accordance with the present application. The general architecture of the hosting environment depicted in FIG. 2 includes an arrangement of computer hardware and software components that may be used to implement aspects of the present disclosure. As illustrated, the hosting environment includes a processing unit 204, a network interface 206, a computer readable medium drive 207, an input/output device interface 220, all of which may communicate with one another by way of a communication bus.

The network interface 206 may provide connectivity to one or more networks or computing systems, such as the network 140 of FIG. 1. The processing unit 204 may thus receive information and instructions from other computing systems or services via a network. The processing unit 204 may also communicate to and from memory 210 and further provide output information. In some embodiments, the hosting environment may include more (or fewer) components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the client 102. The memory 210 may further include computer program instructions and other information for implementing aspects of the present disclosure. For example, in one embodiment, the memory 210 includes a host browsing component 114 that can interface with a corresponding browsing component on the client computing device 102. Additionally, in some embodiments, the host browsing component 114, or network-based browsing component, can further implement one or more aspects of the functionality attributable to the browsing component 104 of the client computing device 102. Accordingly, one skilled in the relevant art will appreciate that the host browsing component 114 can implement all or portions of the functionality described with regard to the function of the browsing component 104 of the client computing device 102.

Figure 3:
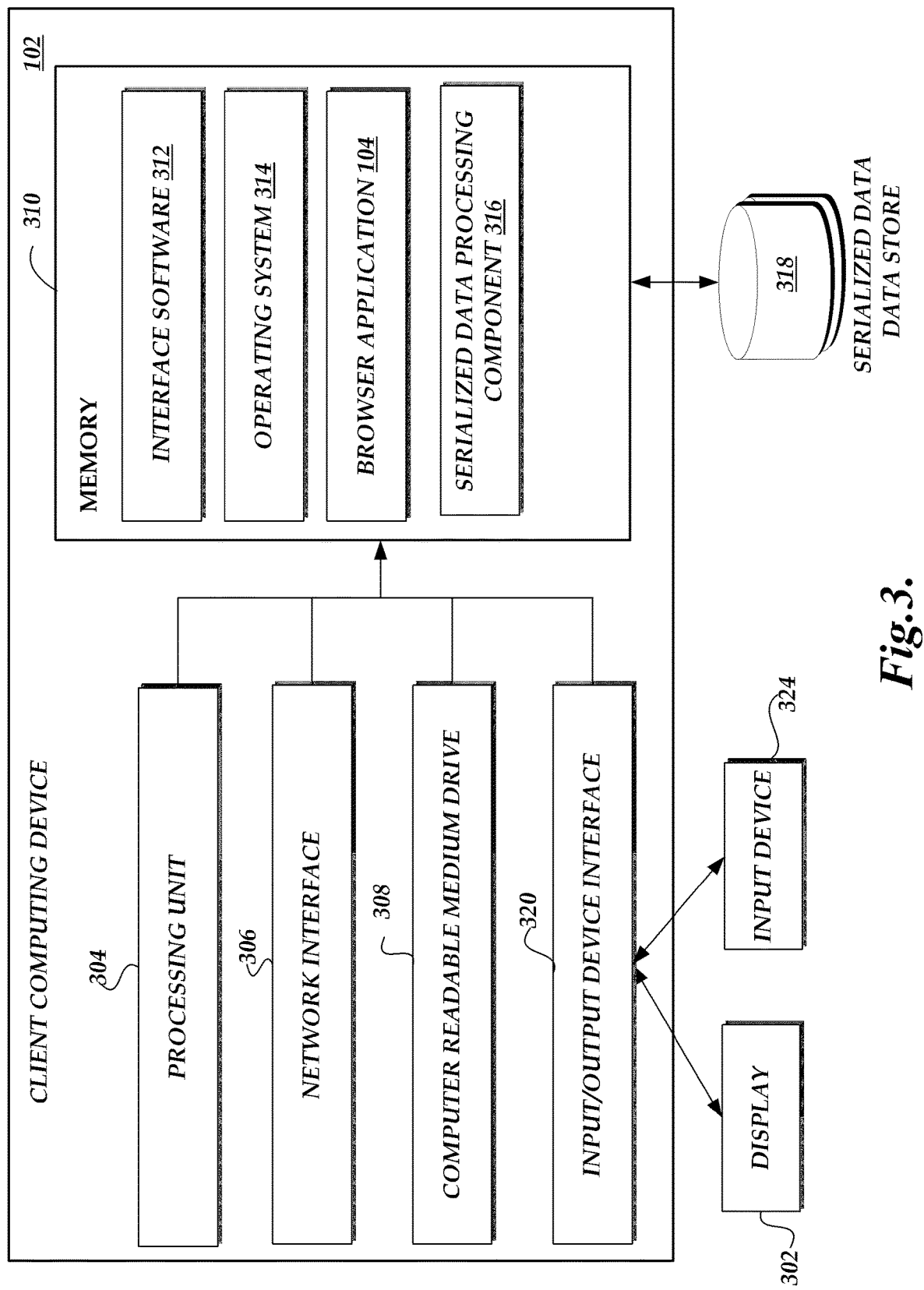
FIG. 3 is a block diagram of illustrative components of a client computing device for processing content in accordance with the present application.

FIG. 3 depicts one embodiment of an architecture of an illustrative a client computing device 102 that can generate and process browser content in accordance with the present application. The general architecture of the client computing device 102 depicted in FIG. 3 includes an arrangement of computer hardware and software components that may be used to implement aspects of the present disclosure. As illustrated, the client computing device 102 includes a processing unit 304, a network interface 306, a computer readable medium drive 307, an input/output device interface 230, an optional display 302, and an input device 324, all of which may communicate with one another by way of a communication bus.

The network interface 306 may provide connectivity to one or more networks or computing systems, such as the network 140 of FIG. 1. The processing unit 304 may thus receive information and instructions from other computing systems or services via a network. The processing unit 304 may also communicate to and from memory 310 and further provide output information for an optional display 302 via the input/output device interface 330. The input/output device interface 320 may also accept input from the input device 324, such as a keyboard, mouse, digital pen, etc. The inputs to the client computing device 102 may be internal to the device, such as contained within a housing, or external to the device and connected via a wired or wireless interface.

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the user computing device 102. The memory 310 may further include computer program instructions and other information for implementing aspects of the present disclosure. For example, in one embodiment, the memory 310 includes a browser component 104 for accessing content and communicating with and processing information from one or more content providers 130. Additionally, for purposes of illustration, the browsing component 104 can interface with a serialized data processing component 316 for generating serialized data files in accordance with the present application. Although illustrated as separate components, the browser component 104 and the serialized data processing component 316 may be integrated all or in part. The client computing device 102 can also include a code data store 318 for maintaining serialized data for processing the browser content or to retain information created in the generated of updated content.

Figure 4A:
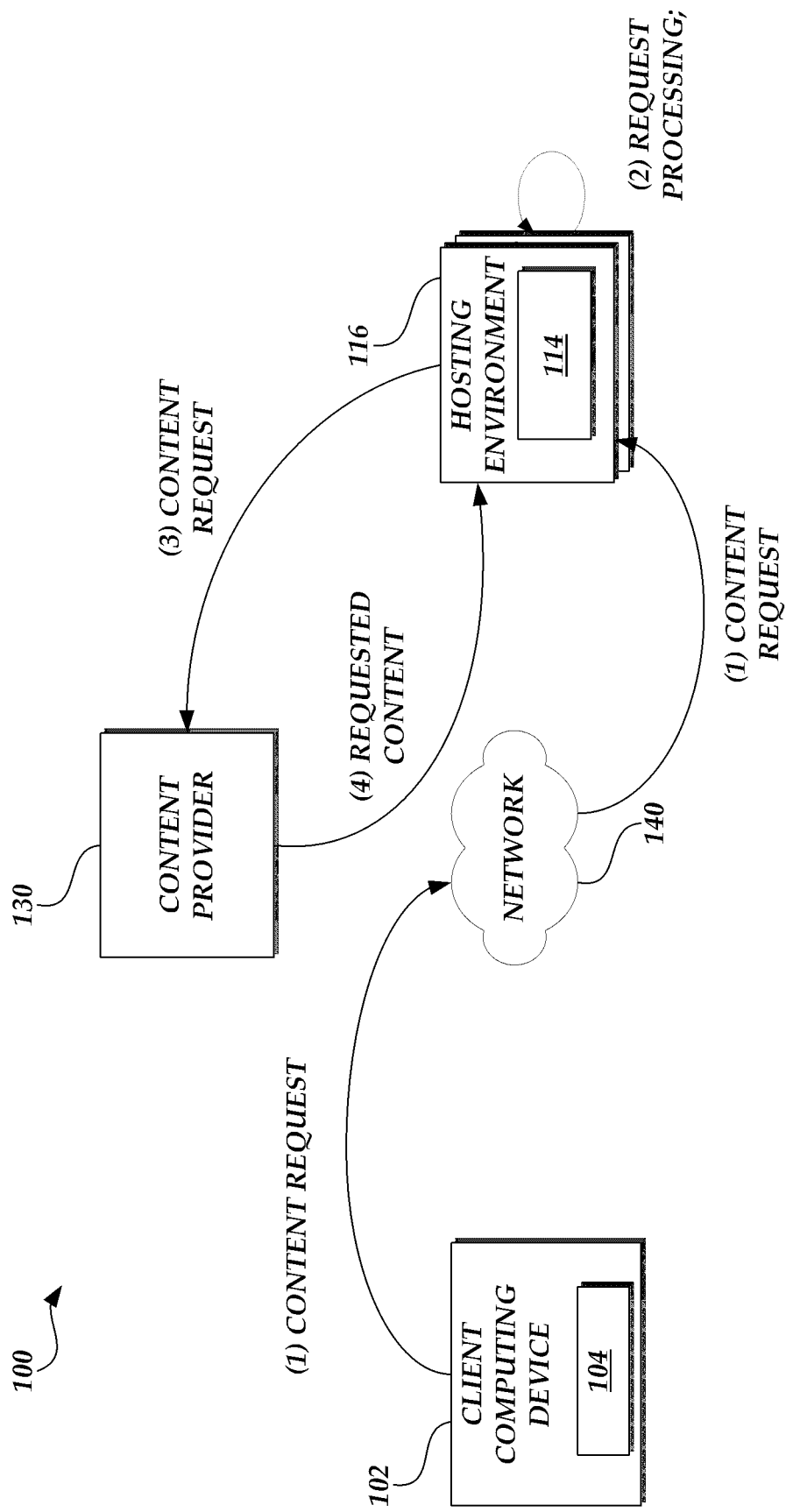
FIG. 4A is a block diagram of the logical network of FIG. 1 illustrating the requesting and processing content utilizing serialized data in accordance with the present application.
Figures 1, 4B:
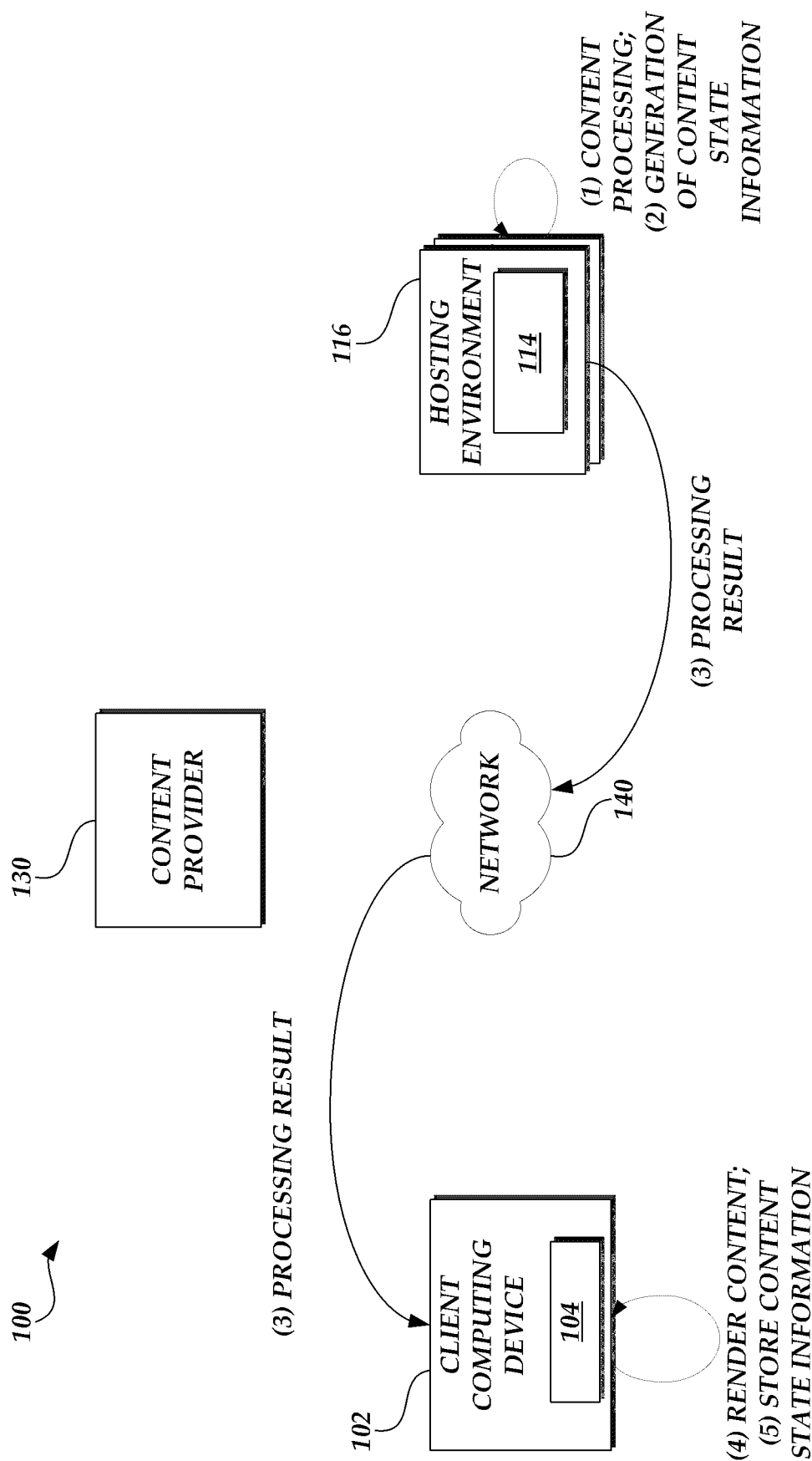
Figures 2, 4B:
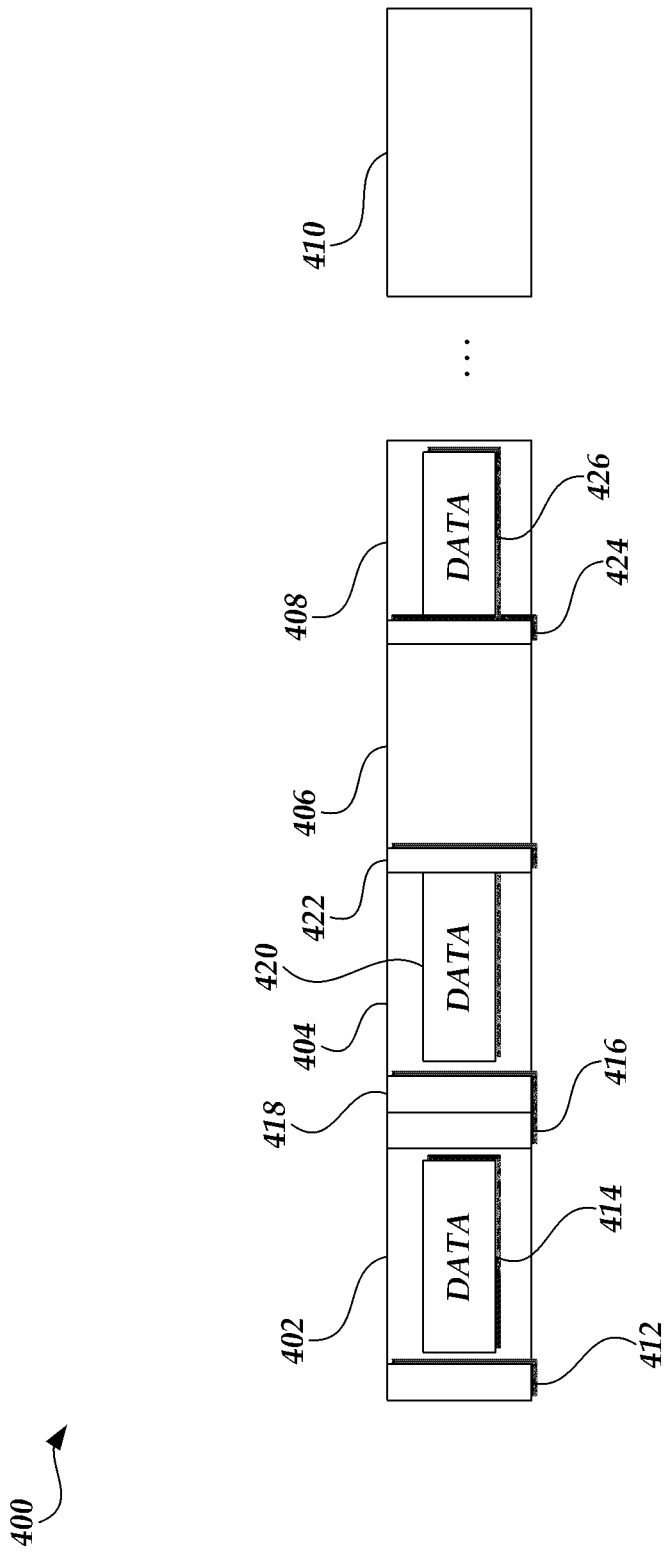
Figure 4C:
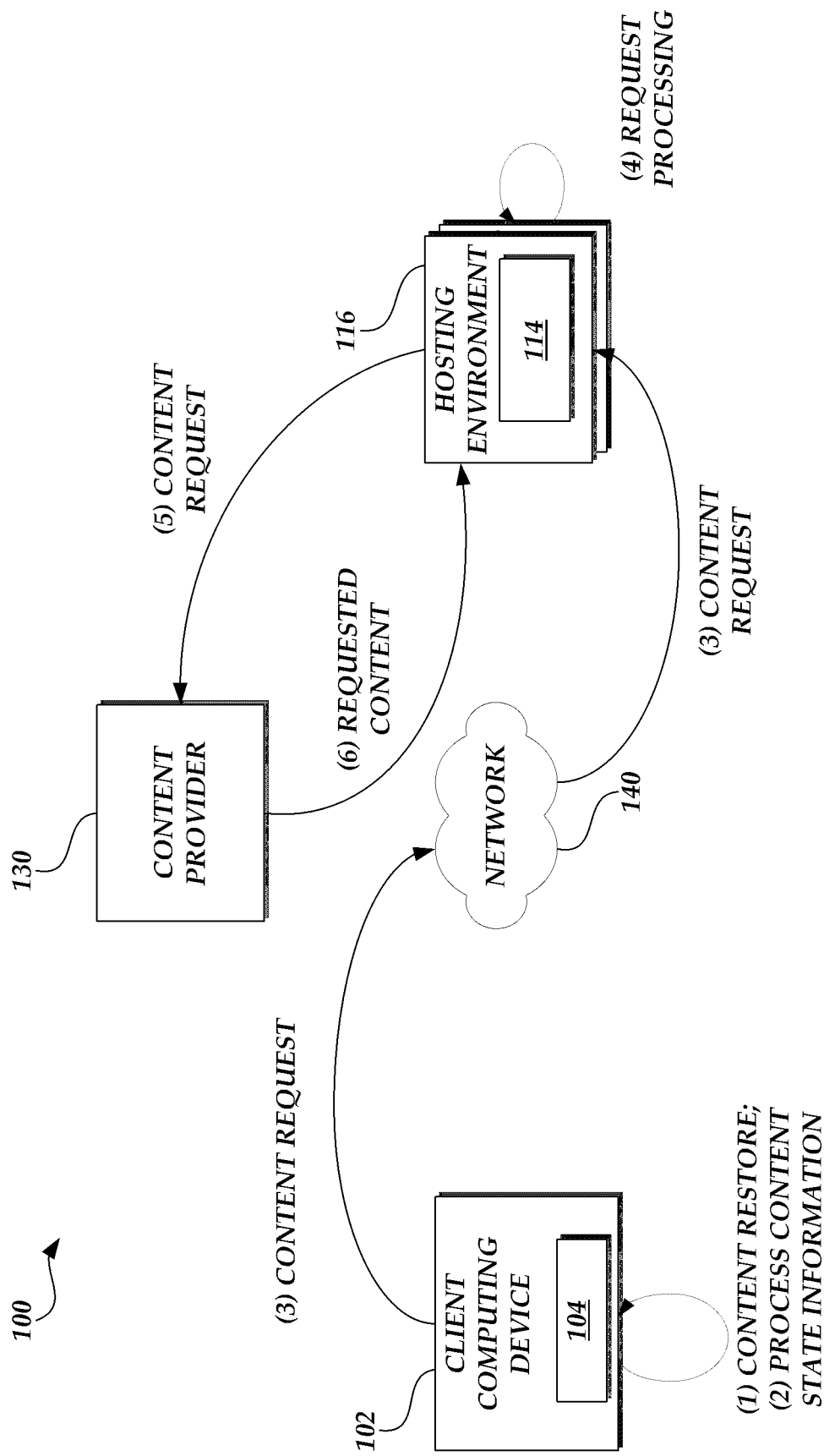
FIGS. 4C and 4D are block diagrams of the logical network of FIG. 1 illustrating the requesting and processing content utilizing serialized data in accordance with the present application.
Figure 4D:
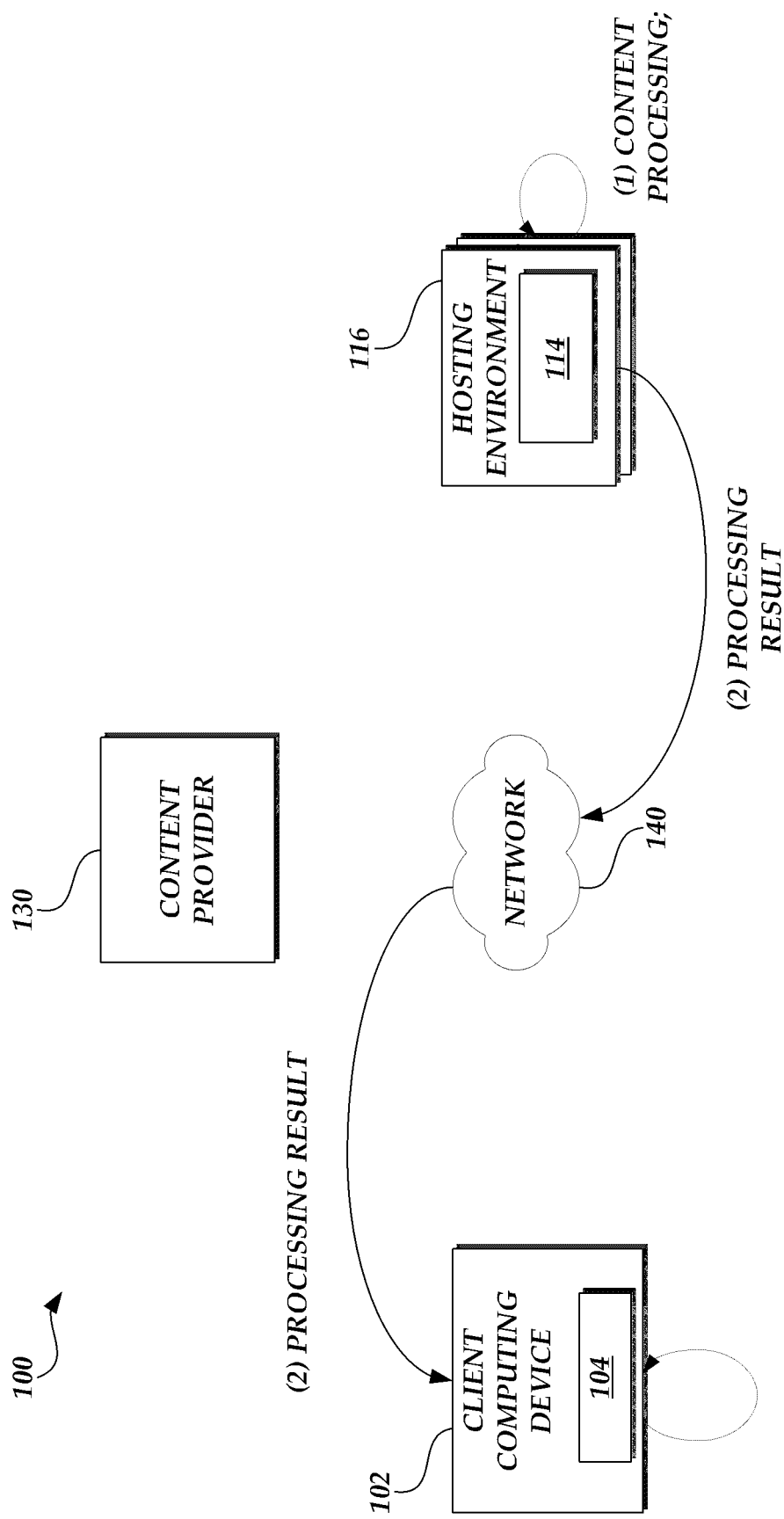
Figure 5A:
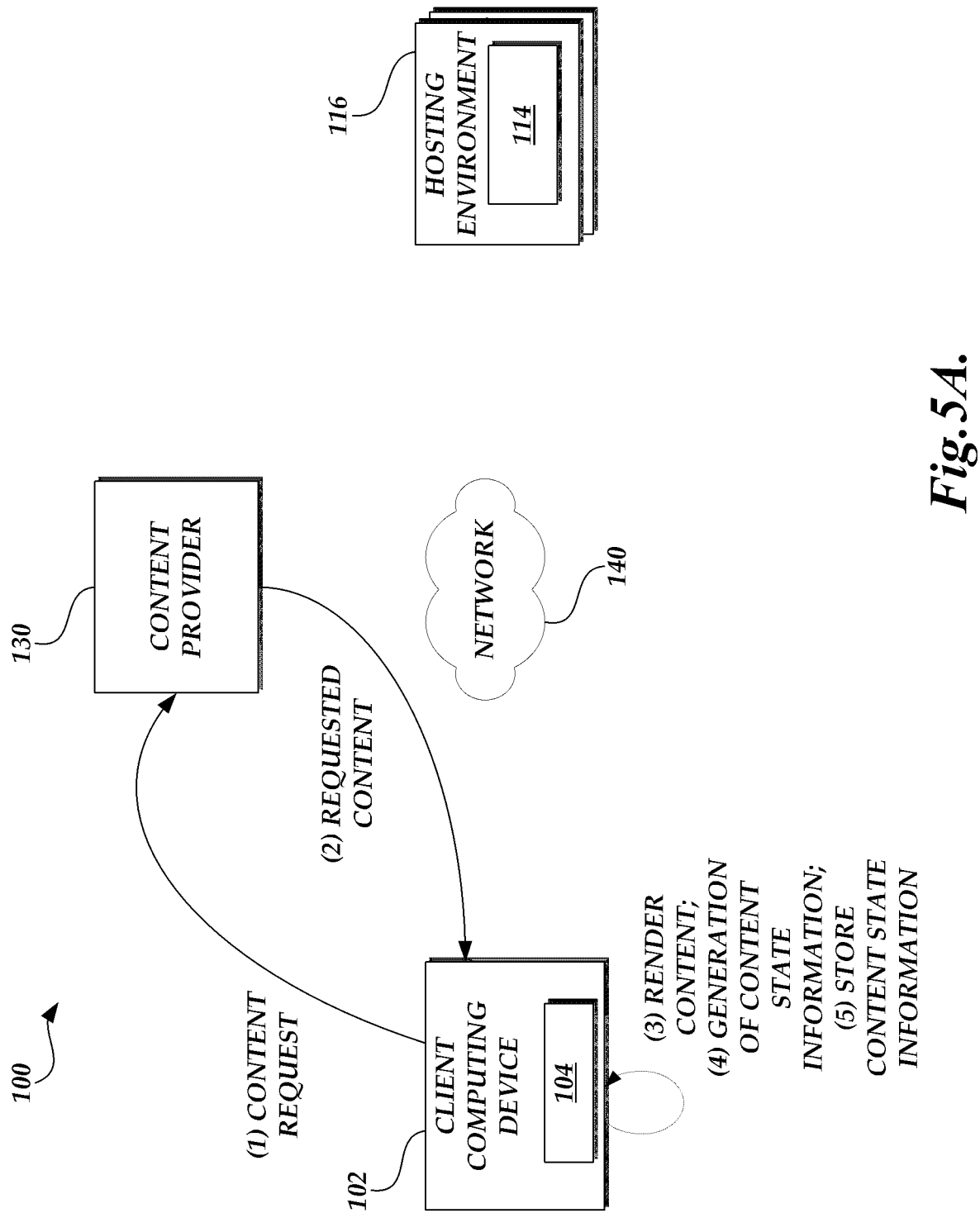
FIGS. 5A and 5B are block diagrams of the logical network of FIG. 1 illustrating the processing of requesting and processing content utilizing serialized data in accordance with the present application.
Figure 5B:
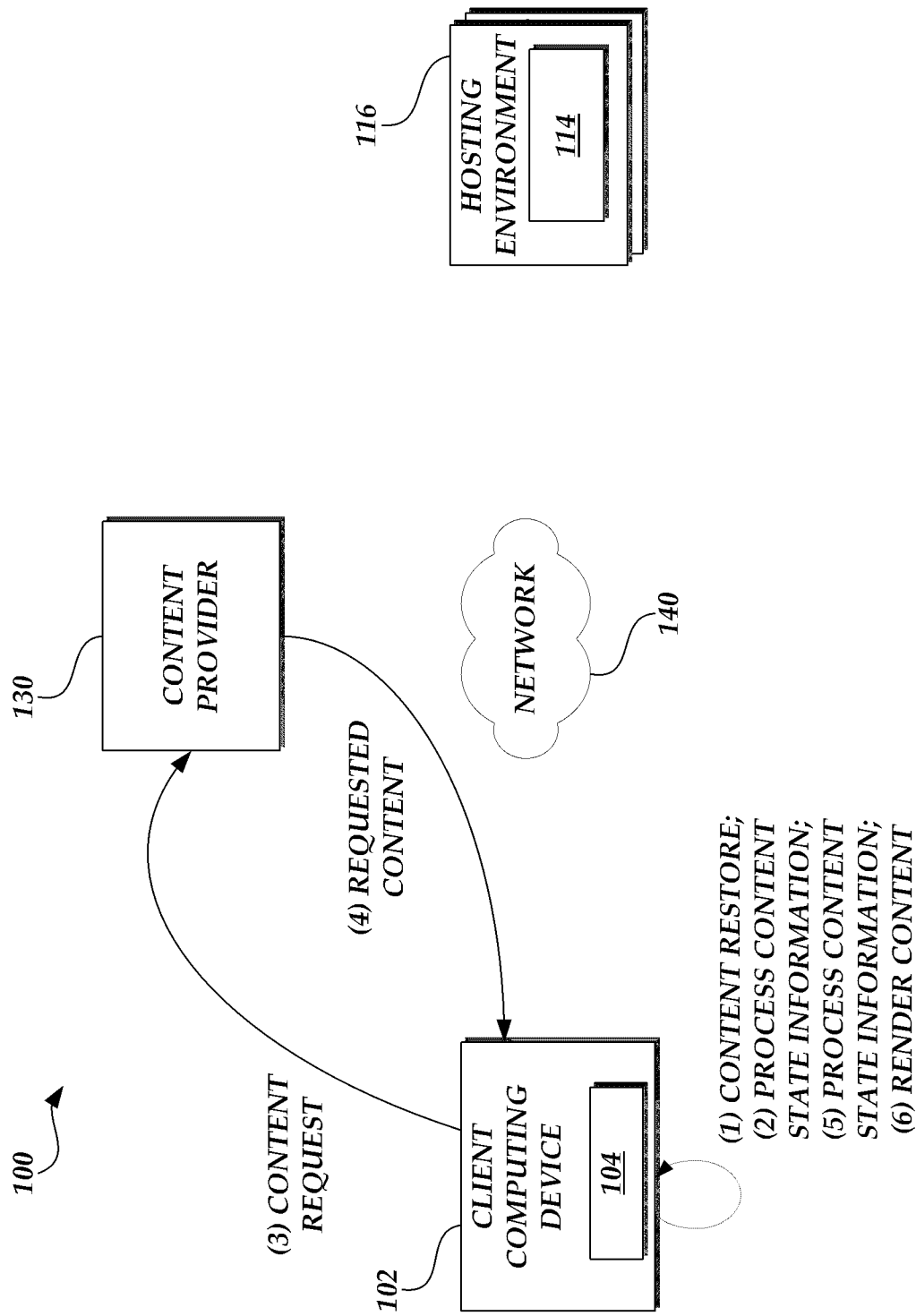

Turning now to FIGS. 4A-4D, 5A, and 5B illustrative interactions between the components of the logical network 100 in processing browser content will be described. More specifically, FIGS. 4A-4D will illustrate the processing of browser content with regards to cooperation between the client computing device browser component 104 and the network-based browsing component 114. FIGS. 5A and 5B will illustrate an alternative embodiment in which the client computing device browser component 104 interacts directly with the content providers 130.

With reference to FIG. 4A, at (1), the client computing device 102 transmits a request to the service provider 110 that is received at the network based browser 114. Illustratively, a user can initiate the request by selecting content from the instantiated browser component 104 via one of many possible interfaces. Although illustrated as a single request, the browser component 104 and browser component 114 can exchange multiple communications, including for purposes of authentication and for establishing how the two browsers will process content. More specifically, the two browser components 104 and 114 may establish a browser configuration that for purposes of the present application can establish whether the browser component 114 will process received content prior to transmitting to the browser component 104 or whether the browser component 114 will send unprocessed content to the browser component 104, which can then further process the content. For purposes of the illustration of FIGS. 4A, 4B-1, and 4B-2, it will be assumed that the browser component 114 of the host environment 112 will process at least a portion of the content.

At (2), the browser component 114 processes the request. In one aspect, the browser component 114 can function as a proxy application and forward the request from the browser component 104 to the content provider 130. In another aspect, the browser component 114 transmits an independent request for content to the content provider 130. In this embodiment, the browser component 114 can utilize additional or alternative information as part of the request, such as profile information specified by the service provider and networking information completely independent of the client computing device 102. At (3), the browser component 114 transmits the content request to the content provider 130 for processing. At (4), the content provider 130 provides the requested content. Although illustrated as a single request, the browser component browser component 114 and content provider 130 can exchange multiple communications, including for purposes of authentication and security for obtaining the requested content. Additionally, as will be described in detail below, the content provider 130 can either provide an original version of the requested content or content optimized for mobile devices.

With reference to FIG. 4B-1, in this embodiment, the browser component 114 will process the content to replace one or more portions of the static content. At (1), the browser component 114 processes the browser content to generate a processing result. One skilled in the relevant art will appreciate that content to be generated on a display can be provided to a browser component from a content provider 130 in the form of markup language, e.g., HTML, and display information, e.g., cascading style sheets ("CSS"). To process the content, the browser component 114 parses the HTML and CSS information to create a set of tree structures of elements, referred to as a document object model ("DOM") tree and CSS object model ("CSSOM") tree. As will be explained in greater detail below, in some embodiments, the DOM tree nodes organized relatively close to the root of the DOM tree can include page layout dimensions. Accordingly, serialization of at least this portion of the DOM tree nodes can facilitate the restoration of the browser content prior to obtaining subsequently requested browser content and computing the CSSOM tree or other CSS-related information.

Additionally, the browser content can also include executable code, such as scripts, that can be executed by a scripting engine to modify the underlying content, replace content or request additional content or affect the DOM tree, CSSOM tree, etc. The browser component 114 can then merge the tree structures to identify elements that correspond to elements that will be visible on a display in the form a render tree display object in which each element of the render tree element corresponds to information as to how a display object will be displayed and where it will be displayed relative to other display objects. A rendering engine on the device can then utilize the render tree to cause a display of the elements, referred to as "painting" via the output interface. Illustratively, the processing of the browser content can include compiling scripting language into a set of compiled machine code executable by the client computing device 102. In another example, processing of the browser content can include processing scripting language to obtain a result that can then be utilized in the browser content to be rendered, such as determining numerical values, decision logic (e.g., true or false), and the like. The processing of the browser content can further include the identification of various network address references such as uniform resource identifiers that correspond to additional network resources referenced by the browser content.

As will be explained in detail below, at (2), the browser component 114 can form the set of state information to be utilized in serialization from the set of processing results, including the DOM tree information, CSSOM tree information, render tree information, scripting engine state information, rendering tree engine information, and the like. Additionally, the browser component 114 can include meta-data or other identification information that can be utilized to match the serialized data portions to the browser data along with intermediate processing state information that corresponds to the processing state of the browser content at various intermediate states in the processing process. For example, the meta-data can include information regarding the values of variable during interim processing steps. In another example, the meta-data can correspond to progress phase identifiers that correspond to specific interim rendering steps. In still another example, the meta-data can include a dependency graph identifying resources and rendering processes and an order in which the rendering processes were implemented to generate the final processing result. The meta-data can further identify one or more rendering processes that may become invalid or further modified by subsequently implemented rendering processes.

Illustratively, in forming the set of information (or after the formation of the set of state information), the browser component 114 can further to determine an order of priority for the set of serialized data portions. In one embodiment, the browser component 114 can determine resources consumed during the processing of the content to generate the respective portion of the processing result or a time required to process the resources to generate the respective portion of the processing result. In other embodiments, the browser component 114 can be configured to identify a type of state information that may be more beneficial or considered to have a higher priority in the event that the serialization process is interrupted. Examples can include serializing state data related to the generation of the visual display objects before processing linking information. As described above, in one example, such information can include DOM tree node information including layout information. In still other embodiment, the browser component can prioritize based on content provider preferences for prioritization or if client computing device preferences, and the like.

Utilizing the prioritization information, the browser component 114 can then begin serializing the set of state information based on the priority set for the set of state information. Illustratively, the browser component 114 can process each portion of the state information (e.g., the set of state information) as discrete objects. In some embodiments, the browser component 114 can attempt to iterate through each piece of state information in the set of state information until the process is either interrupted or the entire set of state information is serialized. Additionally, in other embodiments, the browser component 114 can further process multiple pieces of state information in parallel and independently based on the resources available. For example, if the serialization process is running as a background application, the browser component 114 may initiate multiple layers of serialization depending on an amount of processing resources available.

With continued reference to FIG. 4B-1, at the start of the serialization process, the browser component 114 can generate a serialized data file prior to the generation of the serialized data portions. Illustratively, the browser component 114 will not generate a serialized data file for each set of state information. Rather, the browser component 114 can generate a single serialization data file or a smaller subset of serialization data files that encompass or have the ability to encompass the set of state information. Accordingly, the browser component can be configured to anticipate the data size for individual portions of serialized data. In one example, the data size may be a standard size or set of sizes for multiple types of serialized data. In another example, the browser component 114 may be configured with processing logic that can associate or correlate the size of the serialized data with the size of the underlying state information. The generated serialized data file can include placeholders for individual serialized data portions once they are serialized utilizing the anticipated data size.

As individual serialized data portions are processed, they can be added to the serialized data file (or serialized data files) with a completion marker. Illustratively, the completion marker can be a unique identifier that has a lower likelihood of being interpreted as parts of the serialized data when the serialized data is processed. In one embodiment, the browser component 114 can be configured with predetermined unique identifiers, such as byte sequences that are not typically found in examined sets of serialized data. In other embodiments, the browser component 114 can be select or be assigned with the unique identifiers. If the serialization process is interrupted before all the browser information is serialization, the browser is still able to utilize any portions in the serialized data file that are accompanied by a completion marker. In some embodiments, the serialization process can be dependent on the occurrence of timing events, such as a received command from a user, the instantiation of an application, the monitoring of processing resources to provide an indication of potential failures or resets, and the like.

Turning now to FIG. 4B-2, an illustrative serialized data file 400 illustrating various aspects of the generation of partial serialized data will now be described. As illustrated in FIG. 4B-2, the serialized data file 400 includes a set of placeholders 402, 404, 406, 408, and 410 that correspond to allocations of the serialized data file that the browser component 114 has defined for holding serialized data portions. For purposes of illustration, placeholders 402-406 may correspond to equal sized allocations, such as a default allocation or based anticipated memory for the series of bytes corresponding to the respective serialized data. In contrast placeholder 408 may correspond to a smaller allocation, while placeholder 410 corresponds to a larger allocation.

As the browser component 114 implements the serialization process, serialized data bytes 414, 420 and 426 can be written to respective placeholders 402, 404 and 408. Additionally, each placeholder 402, 404, and 406 can include identifiers, such as hash identifiers, 412, 418, and 424 that can be utilized to determine whether there are matching portions in subsequent process, as described below. In some embodiments, one or more of the hash identifiers 412, 428 and 424 may be omitted.

If the serialization process for individual bits of state information completes, the serialized data file 400 can include completion markers 416 and 422. Illustratively, the completion markers can corresponds to uncommon or a least used byte sequence. As will be explained below, the existence of the completion markers 416 and 422 can be indicative that the respective data 414 and 420 are valid in that the serialization process completed. If the serialization process is terminated, interrupted or otherwise does not complete, data, such as data 426, does include a corresponding completion marker and will be ignored or discarded. Similarly, placeholders 406 and 410 may remain empty if the serialization process does not complete or is invalid, if a memory threshold is reached, etc.

Returning to FIG. 4B-1, at (3), the browser component 114 transmits the processing result to the client computing device 102 for rendering of the browser content. The processing result that is transmitted to the client computing device may be based on the browser configuration between the network browser component 114 and the client computing device browser component 104 as described above. Additionally, in some embodiments, the browser component 114 will transmit the serialized data file that will include at least portions of serialized data. At (4), the client-based browser component 104 can render the processing result on the display of the client computing device 102. Additionally, at (5), the browser component 104 will also store the serialized content state information for potential use later, as will be described below. In one alternative embodiment, the browser component 104 may further attempt to complete additional serialization of the data portions provided by the browser component 114. The subsequent utilization of the serialized data file will be described below.

Turning now to FIGS. 4C and 4D, an illustrative interaction for the utilization of a serialized data file including at least some portions of serialized state information will be described. With reference to FIG. 4C, at (1), the browser component 104 obtains a restore request for the browser content that has been previously requested. For example, the restore request may correspond to a recovery from a crash and re-initialization of the browser component 104 to restore any browser content that was rendered at the time of the crash. In another example, the restore request may correspond to a pre-configured request for the browser content based on some event, such as time of day, instantiation of other applications, or some other input. In still another example, the restore request can be responsive to the execution of a restart command initiated by a user or an application.

At (2), the browser component 104 processes the serialized data file (e.g., the content state information). In some embodiments, the browser component 104 can attempt to utilize serialized data to begin rendering content to the client computing device 102 prior to receiving the subsequently requested browser content. For example, if the serialized data includes DOM tree or render tree state information, such as the DOM tree node information or CSSOM tree node information that includes layout information, the browser component 104 can utilize that type of information to begin rendering prior to receiving the re-requested browser content. More specifically, the rendering processes implemented by the browser component 104 can identify nodes of the DOM tree that correspond to visible objects to be rendered, any potential display attributes included in the CSSOM tree and generate at least a partial render tree that is used to paint the render tree objects on the display screen. Even with partial information from the DOM tree or CSSOM tree, including omitted information from CSSOM tree, the browser component 104 can generate a render tree with the partial information that can be repainted with the subsequently requested browser content can be processed (in full and in part) to complete the process. Still further, in some embodiments, the serialized data may correspond to original or intermediate information that may be subsequently be altered after all the browser content processing results are determined. However, in some embodiments, the browser component may proceed to utilize the original or intermediate state information to improve the perception of performance to users.

At (3), the client computing device 102 transmits a request to the service provider 110 that is received at the network based browser 114. Illustratively, a user can initiate the request by selecting content from the instantiated browser component 104 via one of many possible interfaces. Although illustrated as a single request, the browser component 104 and browser component 114 can exchange multiple communications, including for purposes of authentication and for establishing how the two browsers will process content. More specifically, the two browser components 104 and 114 may establish a browser configuration that for purposes of the present application can establish whether the browser component 114 will process received content prior to transmitting to the browser component 104 or whether the browser component 114 will send unprocessed content to the browser component 104, which can then further process the content.

At (4), the browser component 114 processes the request. In one aspect, the browser component 114 can function as a proxy application and forward the request from the browser component 104 to the content provider 130. In another aspect, the browser component 114 transmits an independent request for content to the content provider 130. In this embodiment, the browser component 114 can utilize additional or alternative information as part of the request, such as profile information specified by the service provider and networking information completely independent of the client computing device 102. At (5), the browser component 114 transmits the content request to the content provider 130 for processing. At (6), the content provider 130 provides the requested content. Although illustrated as a single request, the browser component browser component 114 and content provider 130 can exchange multiple communications, including for purposes of authentication and security for obtaining the requested content. Additionally, as will be described in detail below, the content provider 130 can either provide an original version of the requested content or content optimized for mobile devices.

Turning to FIG. 4D, at (1), the browser component 114 processes the browser content to generate a processing result. One skilled in the relevant art will appreciate that content to be generated on a display can be provided to a browser component from a content provider 130 in the form of markup language, e.g., HTML, and display information, e.g., cascading style sheets ("CSS"). To process the content, the browser component 114 parses the HTML and CSS information to create a set of tree structures of elements, referred to as a DOM tree and CSSOM tree. Additionally, the browser content can also include executable code, such as scripts, that can be executed by a scripting engine to modify the underlying content, replace content or request additional content or affect the DOM tree, CSSOM tree, etc. The processing of the browser content can further include the identification of various network address references such as uniform resource identifiers that correspond to additional network resources referenced by the browser content. The browser component 114 can then merge the tree structures to identify elements that correspond to elements that will be visible on a display in the form a render tree display object in which each element of the render tree element corresponds to information as to how a display object will be displayed and where it will be displayed relative to other display objects. A rendering engine on the device can then utilize the render tree to cause a display of the elements, referred to as "painting" via the output interface. At (2), the browser component 114 transmits the processing result to the client computing device 102.

At (3), the browser component 104 processes the content state information (e.g., the serialized data file) and the processing result received by browser component 114. Illustratively, once the requested browser content is received, the browser component 104 will attempt to utilize as much of the serialized data file portions that can be matched to the requested content and that are associated with a valid completion marker. In one embodiment, each portion of the set of serialized data can be associated with a hash that can be used to match with the corresponding browser content or processing result. If the browser component 104 can match a hash or other identifier, the browser component will attempt to utilize the portion of the serialized data file and may omit processing the received browser content processing result, such as by skipping the parsing of source code. In another embodiment, the browser component 104 can utilize embedded tags or other meta-data to match portions of the serialized data. Additionally, for any matching portions of serialized data, the browser component 104 will determine whether the matching portion of the serialized data is accompanied with a completion marker. If a completion marker is not present, the browser component 104 will determine that the serialization process was interrupted and will not utilize or otherwise discard the portion of the serialized data. Examples of the how a serialized data file may include the identifiers/tags and completion markers were described with regard to FIG. 4B-2.

Any portions of the serialized data file that cannot be matched (because they relate to subsequent data requests) or were not associated with a completion marker can be discarded or otherwise ignored. However, the browser component 104 can then utilize the state information to replace processing results or omit the further processing of browser content. In one example, the browser component 104 can determine that one or more portions of the serialized data file identify the processing result of an execution of a scripting function and can omit the execution of the scripting function and obtain the result provided in the serialized data. In another example, the browser component 104 can determine that one or more portions of the serialized data file correspond to compile machine code and can omit the compilation of the scripting language provided in the processing result. In a further example, the browser component 104 can determine that one or more portions of the serialized data file defines an order (such as a dependency graph) and omit one or more intermediate render processes from being implemented on the basis that the intermediate render processes are superseded or substantially modified by latter rendering processes.

At (4), the browser component 104 renders the content. By utilizing at least portions of the serialized data file, the speed and subsequent processing of the browser content can be increased and the utilization of computing device resources can be decreased. Such benefits may be more evident in embodiments in which a browser component may have to restore a number of pages of web content (e.g., restoring a multi-tab browsing session).

With reference to FIGS. 5A and 5B, illustrative interaction for an alternative embodiment will be described. At (1), the client computing device 102 transmits a request directly to the content provider 130 without interaction with the browser component 114. Illustratively, a user can initiate the request by selecting content from the instantiated browser component 104 via one of many possible interfaces. At (2), the content provider 130 provides the requested content. Although illustrated as a single request, the browser component 104 and content provider 130 can exchange multiple communications, including for purposes of authentication and security for obtaining the requested content.

At (3), the browser component 104 processes the browser content to generate a processing result and render the requested browser content. As described above, the browser content to be generated on a display can be provided to a browser component from a content provider 130 in the form of markup language, e.g., HTML, and display information, e.g., cascading style sheets ("CSS"). To process the content, the browser component 104 can generally parse the HTML and CSS information to create a set of tree structures of elements, referred to as a DOM tree and CSSOM tree. Additionally, the browser content can also include executable code, such as scripts, that can be executed by a scripting engine to modify the underlying content, replace content or request additional content or affect the DOM tree, CSSOM tree, etc. The processing of the browser content can further include the identification of various network address references such as uniform resource identifiers that correspond to additional network resources referenced by the browser content. The browser component 104 can then merge the tree structures to identify elements that correspond to elements that will be visible on a display in the form a render tree display object in which each element of the render tree element corresponds to information as to how a display object will be displayed and where it will be displayed relative to other display objects. A rendering engine on the device can then utilize the render tree to cause a display of the elements, referred to as "painting" via the output interface. As will be described below, at least some of the above rendering processes or steps can be omitted or taken out of order based on the utilization of the serialized data file.

As will be explained in detail below, at (4), the browser component 104 can form the set of state information to be utilized in serialization from the set of processing results, including the DOM tree information, CSSOM tree information, render tree information, scripting engine state information, rendering tree engine information, and the like. Additionally, the browser component 104 can include metadata or other identification information that can be utilized to match the serialized data portions to the browser data along with intermediate processing state information that corresponds to the processing state of the browser content at various intermediate states in the processing process. Illustratively, in forming the set of information (or after the formation of the set of state information), the browser component 104 can further to determine an order of priority for the set of serialized data portions. In one embodiment, the browser component 104 can determine resources consumed during the processing of the content to generate the respective portion of the processing result or a time required to process the resources to generate the respective portion of the processing result. In other embodiments, the browser component 104 can be configured to identify a type of state information that may be more beneficial or considered to have a higher priority in the event that the serialization process is interrupted. Examples can include serializing state data related to the generation of the visual display objects before processing linking information. In still other embodiment, the browser component can prioritize based on content provider preferences for prioritization or client computing device preferences, and the like.

Utilizing the prioritization information, the browser component 104 can then begin serializing the set of state information based on the priority set for the set of state information. Illustratively, the browser component 104 can process each portion of the state information (e.g., the set of state information) as discrete objects. In some embodiments, the browser component 104 can attempt to iterate through each piece of state information in the set of state information until the process is either interrupted or the entire set of state information is serialized. Additionally, in other embodiments, the browser component 104 can further process multiple pieces of state information in parallel and independently based on the resources available. For example, if the serialization process is running as a background application, the browser component 104 may initiate multiple layers of serialization depending on an amount of processing resources available.

At the start of the serialization process, the browser component 104 can generate a serialized data file prior to the generation of the serialized data portions. Illustratively, the browser component 104 will not generate a serialized data file for each set of state information. Rather, the browser component 104 can generate a single serialization data file or a smaller subset of serialization data files that encompass or have the ability to encompass the set of state information. Accordingly, the browser component can be configured to anticipate the data size for individual portions of serialized data. In one example, the data size may be a standard size or set of sizes for multiple types of serialized data. In another example, the browser component 104 may be configured with processing logic that can associate or correlate the size of the serialized data with the size of the underlying state information. The generated serialized data file can include placeholders for individual serialized data portions once they are serialized utilizing the anticipated data size. An illustrative serialized data file was described with regard to FIG. 4B-2.

As individual serialized data portions are processed, they can be added to the serialized data file (or serialized data files) with a completion marker. Illustratively, the completion marker can be a unique identifier that has a lower likelihood of being interpreted as parts of the serialized data when the serialized data is processed. In one embodiment, the browser component 104 can be configured with predetermined unique identifiers, such as byte sequences that are not typically found in examined sets of serialized data. In other embodiments, the browser component 104 can be select or be assigned with the unique identifiers. If the serialization process is interrupted before all the browser information is serialization, the browser is still able to utilize any portions in the serialized data file that are accompanied by a completion marker. As previously indicated, in some embodiments, the serialization process can be dependent on the occurrence of timing events, such as a received command from a user, the instantiation of an application, the monitoring of processing resources to provide an indication of potential failures or resets, and the like.

at (5), the browser component 104 will also store the serialized content state information for potential use later, as will be described below.

Turning to FIG. 5B, at (1), the browser component 104 obtains a restore request for the browser content that has been previously requested. For example, the restore request may correspond to a recovery from a crash and re-initialization of the browser component 104 to restore any browser content that was rendered at the time of the crash. In another example, the restore request may correspond to a pre-configured request for the browser content based on some event, such as time of day, instantiation of other applications, or some other input. In still another example, the restore request can be responsive to the execution of a restart command initiated by a user or an application.

at (2), the browser component 104 processes the serialized data file (e.g., the content state information). In some embodiments, the browser component 104 can attempt to utilize serialized data to begin rendering content to the client computing device 102 prior to receiving the subsequently requested browser content. For example, if the serialized data includes DOM tree or render tree state information, such as the DOM tree node information including layout information, the browser component 104 can utilize that type of information to begin rendering prior to receiving the re-requested browser content. Still further, in some embodiments, the serialized data may correspond to original or intermediate information that may be subsequently be altered after all the browser content processing results are determined. However, in some embodiments, the browser component may proceed to utilize the original or intermediate state information to improve the perception of performance to users.

at (3), the client computing device 102 transmits a request directly to the content provider 130 without interaction with the browser component 114. Illustratively, a user can initiate the request by selecting content from the instantiated browser component 104 via one of many possible interfaces. At (4), the content provider 130 provides the requested content. Although illustrated as a single request, the browser component 104 and content provider 130 can exchange multiple communications, including for purposes of authentication and security for obtaining the requested content.

at (5), the browser component 104 processes the browser content to generate a processing result. One skilled in the relevant art will appreciate that content to be generated on a display can be provided to a browser component from a content provider 130 in the form of markup language, e.g., HTML, and display information, e.g., cascading style sheets ("CSS"). As previously described, in order to process the received browser content, the browser component 104 would generally parse the HTML and CSS information to create a set of tree structures of elements, referred to as a DOM tree and CSSOM tree. Additionally, the browser content can also include executable code, such as scripts, that can be executed by a scripting engine to modify the underlying content, replace content or request additional content or affect the DOM tree, CSSOM tree, etc. The processing of the browser content can further include the identification of various network address references such as uniform resource identifiers that correspond to additional network resources referenced by the browser content. The browser component 104 can then merge the tree structures to identify elements that correspond to elements that will be visible on a display in the form a render tree display object in which each element of the render tree element corresponds to information as to how a display object will be displayed and where it will be displayed relative to other display objects. A rendering engine on the device can then utilize the render tree to cause a display of the elements, referred to as "painting" via the output interface. As will be described below, at least some of the above rendering processes or steps can be omitted or taken out of order based on the utilization of the serialized data file.

at (6), the browser component 104 processes the content state information (e.g., the serialized data file) and the processing result received by browser component. Illustratively, once the requested browser content is received, the browser component 104 will attempt to utilize as much of the serialized data file portions that can be matched to the requested content and that are associated with a valid completion marker. In one embodiment, each portion of the set of serialized data can be associated with a hash that can be used to match with the corresponding browser content or processing result. If the browser component 104 can match a hash or other identifier, the browser component will attempt to utilize the portion of the serialized data file and may omit processing the received browser content processing result, such as by skipping the parsing of source code. In another embodiment, the browser component 104 can utilize embedded tags or other meta-data to match portions of the serialized data. Additionally, for any matching portions of serialized data, the browser component 104 will determine whether the matching portion of the serialized data is accompanied with a completion marker. If a completion marker is not present, the browser component 104 will determine that the serialization process was interrupted and will not utilize or otherwise discard the portion of the serialized data.

Any portions of the serialized data file that cannot be matched (because they relate to subsequent data requests) or were not associated with a completion marker can be discarded or otherwise ignored. However, the browser component 104 can then utilize the state information to replace processing results or omit the further processing of browser content. At (7), the browser component 104 renders the content. By utilizing at least portions of the serialized data file, the speed and subsequent processing of the browser content can be increased and the utilization of computing device resources can be decreased. Such benefits may be more evident in embodiments in which a browser component may have to restore a number of pages of web content (e.g., restoring a multi-tab browsing session). As previously referenced, in one example, the browser component 104 can determine that one or more portions of the serialized data file identify the processing result of an execution of a scripting function and can omit the execution of the scripting function and obtain the result provided in the serialized data. In another example, the browser component 104 can determine that one or more portions of the serialized data file correspond to compile machine code and can omit the compilation of the scripting language provided in the processing result. In a further example, the browser component 104 can determine that one or more portions of the serialized data file defines an order (such as a dependency graph) and omit one or more intermediate render processes from being implemented on the basis that the intermediate render processes are superseded or substantially modified by latter rendering processes.

Figure 6:
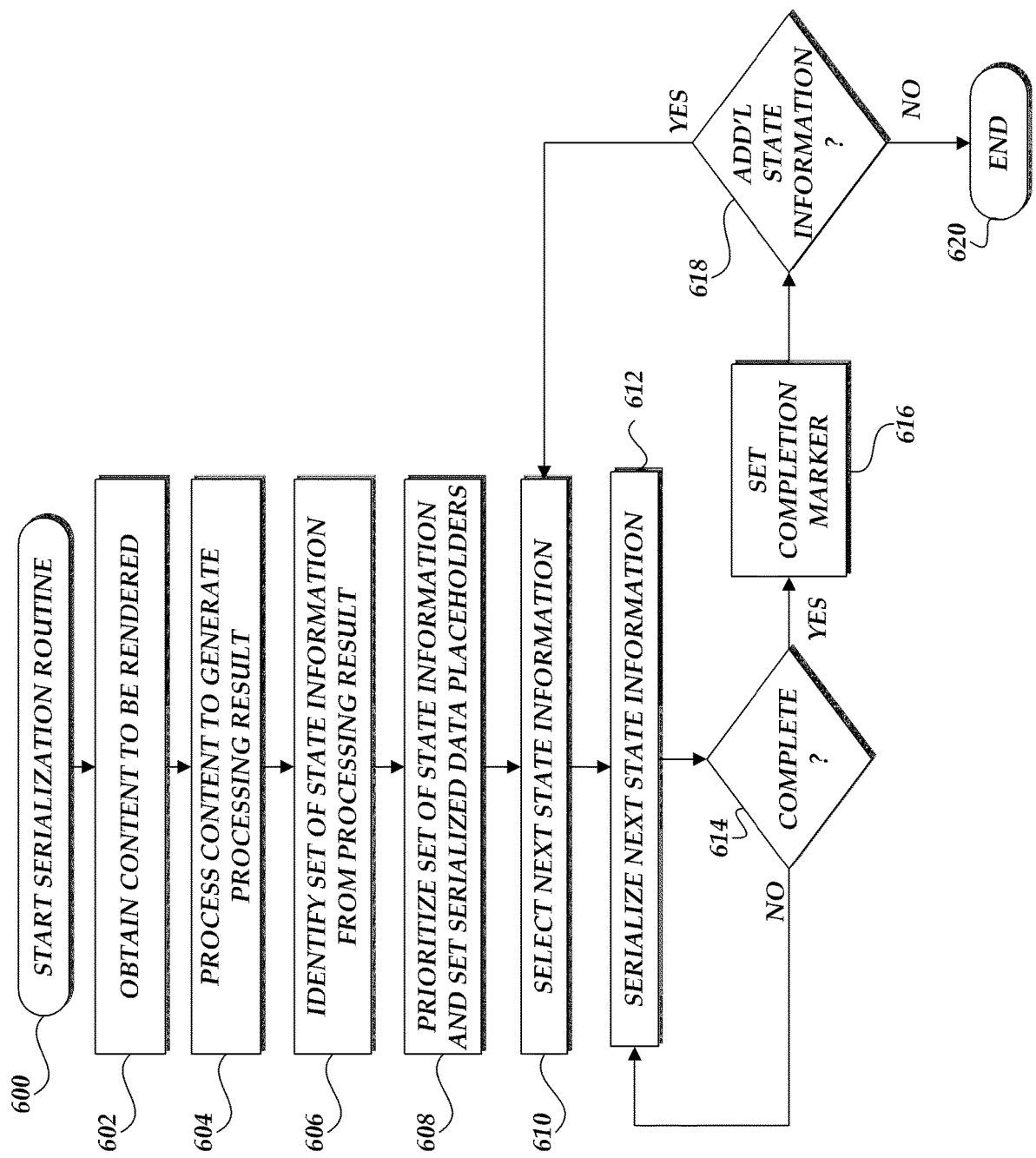
FIG. 6 is a flow diagram illustrative of a data serialization routine implemented by a computing device in accordance with the present application.

FIG. 6 is a flow diagram illustrative of a data serialization routine 600 implemented by a computing device in accordance with the present application. Illustratively, routine 600 may be implemented by browser component 104, browser component 114, or a combination thereof. Accordingly, routine 600 will be described solely with regard to a browser component.

At block 602, the browser component obtains browser content and processes the browser content to generate a processing result at block 604. As previously discussed, the content to be generated on a display can be provided to a browser component from a content provider 130 in the form of markup language, e.g., HTML, and display information, e.g., cascading style sheets ("CSS"). To process the content, the browser component parses the HTML and CSS information to create a set of tree structures of elements, referred to as a DOM tree and CSSOM tree. Additionally, the browser content can also include executable code, such as scripts, that can be executed by a scripting engine to modify the underlying content, replace content or request additional content or affect the DOM tree, CSSOM tree, etc. The processing result related to executable code can include the parsing of the executable code into machine readable code, the execution of the executable code to determine a value, set of values or change in values, and the like. The processing of the browser content can further include the identification of various network address references such as uniform resource identifiers that correspond to additional network resources referenced by the browser content. The browser component can then merge the tree structures to identify elements that correspond to elements that will be visible on a display in the form a render tree display object in which each element of the render tree element corresponds to information as to how a display object will be displayed and where it will be displayed relative to other display objects. A rendering engine on the device can then utilize the render tree to cause a display of the elements, referred to as "painting" via the output interface.

As previously indicated, during processing of content, browser component 104 can preserve information regarding results from intermediate rendering processes and decisions, such as short-term layout dimensions or return values and side-effects from complex script functions. For such types of changes, the browser component 104 can store meta-data corresponding to DOM nodes or scripting engine objects. For example, if the page will later dynamically replace some part of the content (e.g., through executing script code), the parent node of the DOM tree can contain information indicating that the child was replaced, identifying information for the removed child, timing information such as how long after a given event the replacement happened, and which script function's execution caused the change. In other example, one or more nodes of the DOM tree can include meta-data corresponding to a sequence of future changes when restoring (de-serializing) the content that can be used suggest or hint an order for taking the rendering processes. Illustratively, the data will be kept associated with nodes or objects for the lifetime of the page. Additionally, data corresponding to interim rendering steps may be tagged with phase identifiers. For example, retrieving (making available) a specific resource can cause incrementing the phase identifier, indicating an event is allowed to take place. When a list of hints is present, two consecutive hints may indicate a range of phase identifiers. Still further, the processing or collecting of information can be stopped after given time has elapsed since page load started, or after no major change events have happened for given period, such as five seconds.

As block 606, the browser component can form the set of state information to be utilized in serialization from the set of processing results, including information identifying the browser content, the DOM tree information, CSSOM tree information, render tree information, scripting engine state information, rendering tree engine information, and the like. Additionally, as previously described, the browser component can include meta-data or other identification information that can be utilized to match the serialized data portions to the browser data along with intermediate processing state information that corresponds to the processing state of the browser content at various intermediate states in the processing process. Illustratively, the meta-data can include information regarding intermediate states of processing that may not exist in the final parsed state of the browser content.

At block 608, the browser component can further to determine an order of priority for the set of serialized data portions. In one embodiment, the browser component 114 can determine resources consumed during the processing of the content to generate the respective portion of the processing result or a time required to process the resources to generate the respective portion of the processing result. In other embodiments, the browser component 114 can be configured to identify a type of state information that may be more beneficial or considered to have a higher priority in the event that the serialization process is interrupted. Examples can include serializing state data related to the generation of the visual display objects before processing linking information. In still other embodiment, the browser component can prioritize based on content provider preferences for prioritization or if client computing device preferences, and the like.

Utilizing the prioritization information, starting at block 610, the routine enters into an iterative loop to serialize the set of state information based on the priority set for the set of state information. Illustratively, the browser component can process each portion of the state information (e.g., the set of state information) as discrete objects. In some embodiments, the browser component can attempt to iterate through each piece of state information in the set of state information until the process is either interrupted or the entire set of state information is serialized by selecting the next set of information in the set at block 610.

At block 612, the browser component serializes the data portion. Additionally, in other embodiments, the browser can further process multiple pieces of state information in parallel and independently based on the resources available. For example, if the serialization process is running as a background application, the browser component may initiate multiple layers of serialization depending on an amount of processing resources available. In some embodiments, the serialization process can be dependent on the occurrence of timing events, such as a received command from a user, the instantiation of an application, the monitoring of processing resources to provide an indication of potential failures or resets, and the like. For example, in some embodiments, the browser component may attempt to serialize highest priority data shortly after page loading as triggered some specific events, such as "DOM complete", but postpone remaining serialization until later time, such as when switching into another tab or when a crash or exception handler is triggered. Additionally, in other embodiments, the serialization process in decision block 610 can be limited according a size of the set of data that is generated. For example, the browser component can begin to generate the serialized data file and continue to serialize data until a data size threshold is met or exceeded.

As individual serialized data portions are processed, they can be added to the serialized data file (or serialized data files) with a completion marker. Illustratively, the completion marker can be a unique identifier that has a lower likelihood of being interpreted as parts of the serialized data when the serialized data is processed. Accordingly, at decision block 614, a test is conducted to determine whether the serialization process is completion. If not, the routine 600 returns to decision block 614. In the event, the routine is terminated prematurely, the serialized data file remains incomplete. If the serialized process is complete, at block 616, the browser component can be configured with predetermined unique identifiers, such as byte sequences that are not typically found in examined sets of serialized data. At decision block 618, a test is conducted to determine whether additional state information in the set of state information. If so, the routine 600 returns to block 610 to select the next state information in the set of state information. If not, the routine 600 terminates at block 620. As previously described, in embodiments in which the browser component 114 generates the serialized data file, the browser component 114 transmits the processing result to the client computing device 102 for rendering of the browser content.

Figure 7:
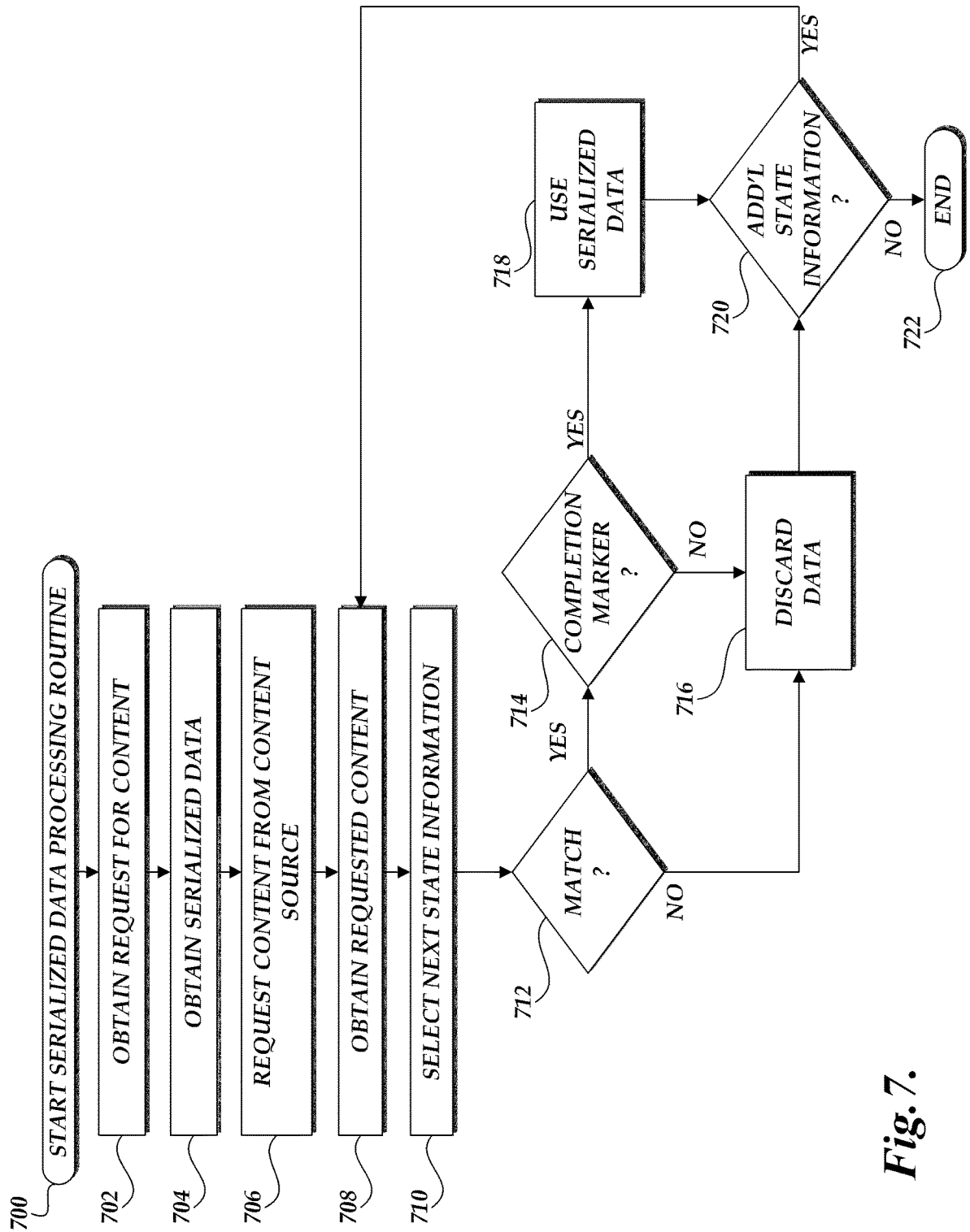
FIG. 7 is a flow diagram illustrative of a serialized data processing routine implemented by a computing device in accordance with the present application.

FIG. 7 is a flow diagram illustrative of a serialized data processing routine 700 implemented by a computing device in accordance with the present application. At block 702, the browser component 104 obtains a restore request for the browser content that has been previously requested. For example, the restore request may correspond to a restoration from a crash, re-initialization of the browser component 104, completion of a restart request or any other process that correlates to an indication that the browser application 104 should restore browser content that was previously rendered. In another example, the restore request may correspond to a pre-configured request for the browser content based on some event, such as time of day, instantiation of other applications, or some other input. At block 704, the browser component 104 obtains the serialized data file. Illustratively, the serialized data file may be locally stored or obtained from a network store.

At block 706, the client computing device 102 transmits a request directly or indirectly) to the content provider 130. Illustratively, a user can initiate the request by selecting content from the instantiated browser component 104 via one of many possible interfaces. Additionally, the determination of browser content request can also be made based on a determination that the serialized data file is incomplete. At block 708, the requested content is obtained from the content provider 130. Although illustrated as a single request, the browser component 104 and content provider 130 can exchange multiple communications, including for purposes of authentication and security for obtaining the requested content.

Upon receipt of the requested content and serialized data file, the browser component 104 processes the browser content to generate a processing result. One skilled in the relevant art will appreciate that content to be generated on a display can be provided to a browser component from a content provider 130 in the form of markup language, e.g., HTML, and display information, e.g., cascading style sheets ("CSS"). To process the content, the browser component 104 parses the HTML and CSS information to create a set of tree structures of elements, referred to as a DOM tree and CSSOM tree. Additionally, the browser content can also include executable code, such as scripts, that can be executed by a scripting engine to modify the underlying content, replace content or request additional content or affect the DOM tree, CSSOM tree, etc. The processing of the browser content can further include the identification of various network address references such as uniform resource identifiers that correspond to additional network resources referenced by the browser content. The browser component 104 can then merge the tree structures to identify elements that correspond to elements that will be visible on a display in the form a render tree display object in which each element of the render tree element corresponds to information as to how a display object will be displayed and where it will be displayed relative to other display objects. A rendering engine on the device can then utilize the render tree to cause a display of the elements, referred to as "painting" via the output interface. As reference above, at least some of the above rendering processes or steps can be omitted or taken out of order based on the utilization of the serialized data file such that the subsequent processing of the browser content is facilitated through the use of the serialized data file.

Illustratively, the browser component 104 processes the content state information (e.g., the serialized data file) and the processing result received by browser component. Illustratively, once the requested browser content is received, the browser component 104 will attempt to utilize as much of the serialized data file portions that can be matched to the requested content and that are associated with a valid completion marker. Illustratively, the browser component 104 can utilize the identification information included in the serialized data file to match the browser content with serialized data. As previously indicated, the browser component 104 can construct a dependency graph based on phase identifiers and resource identifiers to determine which optimizations can be executed before loading given resources. Additionally, as previously discussed, at least some of the rendering processes can be executed out-of-order, earlier than normally possible, when the required information is present and retrievable from the serialized data. For example, a Javascript function can be virtually executed before the corresponding source code is loaded or compiled in embodiments in which a result of the execution of the function and the effect on other objects, including changes to the DOM, are included with the serialized data.

At block 710, the browser application 104 selects the next serialized data portion or the first serialized data portion for the first iteration of block 710. At decision block 712, a test is conducted to determine whether a selected data portion matches the requested content. Illustratively, each portion of the set of serialized data can be associated with a hash that can be used to match with the corresponding browser content or processing result. If the browser component 104 can match a hash or other identifier, the browser component will attempt to utilize the portion of the serialized data file and may omit processing the received browser content processing result, such as by skipping the parsing of source code. In another embodiment, the browser component 104 can utilize embedded tags or other meta-data to match portions of the serialized data. If no match is found, at block 716, the serialized data portion can be discarded or ignored. In some embodiments, in a multi-step dynamic page processing, the browser component 104 may not be able to match some serialized content initially, but later completed resource processes can generate missing content that matches the serialized data. In such embodiments, the browser component 104 can repeat the iterative loop to identify later matched information. Additionally, in other embodiments, at least portions of the serialized data file can be discarded after a specified amount of time or specific events have occurred and it is deemed unlikely that any content would match anymore. Such timing or thresholds may be set by the user, content provider, or other service providers.

Alternatively, at decision block 712, for any matching portions of serialized data the routine 700 proceeds to decision block 714 where a test is conducted to determine whether the matching portion of the serialized data is accompanied with a completion marker. If no completion marker is present, the browser component 104 will determine that the serialization process was not completed properly and the serialized data portion can be discarded or ignored at block 716.

Alternatively, if a matching portion includes the completion marker, at block 718, the browser component 104 can then utilize the state information to replace processing results or omit the further processing of browser content. In other embodiments, the browser component 104 can further utilize the meta-data or other hint information to advance the processing of the content to one or more interim states that can then be further advanced by continued processing by the browser component. For example, the browser component 104 can utilize the partial serialized data to bypass the initial processing of the browser content and continue processing the browser content, such as by processing scripts.

By utilizing at least portions of the serialized data file, the speed and subsequent processing of the browser content can be increased and the utilization of computing device resources can be decreased. Such benefits may be more evident in embodiments in which a browser component may have to restore a number of pages of web content (e.g., restoring a multi-tab browsing session). At decision block 720 a test is conducted to determine whether additional data portions exist in the serialized data file. If so the routine 700 returns to block 710. Alternatively, the routine ends at block 722.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method for processing content for display on a client computing device comprising:
   obtaining first browser content to be displayed on the client computing device;
   processing at least a portion of the first browser content to generate a processing result, the processing result including a plurality of state information including processing states and full or partial processing results for individual nodes of a document object model ("DOM") tree;
   identifying a set of state information from the plurality of state information to be incorporated into a serialized data file;
   prioritizing the set of state information based at least in part on processing the first browser content;
   generating the serialized data file, wherein the generated serialized data file includes placeholders for at least a portion of the set of state information;
   for individual state information in the set of state information,
      generating serialized state information;
      generating a completion marker responsive to completion of the generation of the serialized state information; and
      replacing one of the placeholders in the serialized data file with the serialized state information and the completion marker; and
   responsive to a subsequent request for second browser content to be displayed on the client computing device:
      obtaining the second browser content to be displayed on the client computing device;
      determining that at least one portion of the serialized data file corresponds to the second browser content and that the determined at least one portion includes a valid completion marker indicating that serialization of state information corresponding to the second browser content was completed; and
      processing the second browser content utilizing the at least one portion of the serialized data file.

2. The method as recited in claim 1, wherein prioritizing the set of state information is further based at least in part on a resource consumption associated with processing the first browser content.

3. The method as recited in claim 1, wherein the processing result includes a cascading style sheet object model tree.

4. The method as recited in claim 1, wherein the processing result includes state information related to a scripting engine processing the first browser content.

5. The method as recited in claim 1 further comprising obtaining the serialized data file from a browser component hosted on a network computing device.

6. The method as recited in claim 1, wherein the processing result includes meta-data related to intermediate rendering processes that do not correspond to a page state at a time of rendering.

7. A method for managing content displayed on a client computing device comprising:
obtaining browser content to be displayed on the client computing device;
processing at least a portion of the browser content to generate a processing result, the processing result including a plurality of state information regarding processing states and full or partial processing results for individual nodes of a document object model tree;
identifying, based at least in part on processing the browser content, a set of state information from the plurality of state information to be incorporated into a serialized data file;
generating the serialized data file, wherein the serialized data file includes one or more placeholders for individual state information in the set of state information;
incorporating the set of state information into the serialized data file, comprising, for individual state information in the set of state information:
generating serialized state information;
replacing, in the serialized data file, a placeholder for the state information with the serialized state information; and
storing, in the serialized data file, a completion marker responsive to completion of the generation of the serialized state information; and
responsive to a subsequent request for the browser content:
determining that at least a portion of the serialized data file corresponds to the browser content;
determining that the at least a portion of the serialized data file includes a valid completion marker indicating the completion of the generation of the serialized state information corresponding to the browser content; and
processing the obtained content utilizing the at least a portion of the serialized data file.

8. The method as recited in claim 7 further comprising prioritizing the set of state information.

9. The method as recited in claim 8, wherein prioritizing the set of state information includes prioritizing the set of state information based on a type of state information.

10. The method as recited in claim 7, wherein the processing result includes information identifying browser content sources.

11. The method as recited in claim 7 further comprising generating serialized state information for two or more state information from the set of state information in parallel.

12. The method as recited in claim 7, wherein the completion marker corresponds to a unique byte sequence in the processed browser content.

13. The method as recited in claim 7, wherein the processing result includes progress phase identifiers corresponding to identified interim rendering processes.

14. The method as recited in claim 7, wherein generating serialized state information is responsive to a determination of a serialization event.

15. A method for managing content displayed on a client computing device comprising:
transmitting a request for browser content to be displayed on the client computing device, wherein the browser content corresponds to previously requested browser content;
obtaining browser content to be displayed on the client computing device responsive to a subsequent request for the browser content;
obtaining a serialized data file associated with the requested browser content, wherein individual portions of the serialized data file correspond to full or partial processing results for individual nodes of a document object model ("DOM") tree, wherein individual portions of the serialized data file are prioritized based at least in part on a previous generation of display information related to the browser content, and wherein the serialized data file includes one or more completion markers enabling determination of whether the serialized data file includes valid processing results for individual nodes of the DOM tree;
determining, based at least in part on the one or more completion markers, whether any portions of the serialized data file correspond to the browser content and are valid; and
responsive to a determination that one or more portions of the serialized data file correspond to the browser content and are valid, generating display information related to the browser content based at least in part on processing the one or more portions of the serialized data file.

16. The method as recited in claim 15, wherein determining whether any portions of a serialized data file correspond to the browser content and are valid includes determining whether a hash of a DOM tree node corresponds to a hash associated with one or more portions of the serialized data file.

17. The method as recited in claim 15, wherein determining whether any portions of a serialized data file correspond to the browser content and are valid includes determining whether one or more portions of the serialized data file include a valid completion marker.

18. The method as recited in claim 15 further comprising at least partially rendering the requested browser content based on the one or more portions of the serialized data file prior to receiving the requested browser content.

19. The method as recited in claim 15 further comprising generating a dependency graph identifying resources and rendering processes and defining a processing order, wherein processing the obtained content utilizing one or more corresponding portions of the serialized data file includes executing at least one rendering process in an order different from the processing order.

* * * * *